United States Patent [19]

East

[11] Patent Number: 4,956,925

[45] Date of Patent: Sep. 18, 1990

[54] EDGE THICKNESS CALIPER

[75] Inventor: William S. East, Mt. Airy, N.C.

[73] Assignee: Westinghouse Electric Corp., Pittsburgh, Pa.

[21] Appl. No.: 402,573

[22] Filed: Sep. 5, 1989

[51] Int. Cl.⁵ .................................................. G01B 5/02
[52] U.S. Cl. ........................................ 33/810; 33/783; 33/520
[58] Field of Search ................... 33/644, 501.06, 783, 33/806, 810, 811, 812, 828, 831, 823, 824, 794, 795, 796, 809, 520, 802, 803; 81/126, 128

[56] References Cited

U.S. PATENT DOCUMENTS

| | | | |
|---|---|---|---|
| 468,241 | 2/1892 | Douglas | 81/128 |
| 666,150 | 1/1901 | Mooney | 81/128 |
| 1,624,654 | 4/1927 | Brittain, Jr. | 33/794 |
| 2,228,904 | 1/1941 | Bjorkman | 81/128 |
| 2,645,020 | 7/1953 | Foster | 33/802 |
| 2,780,005 | 2/1957 | Finney et al. | 33/520 |
| 2,807,091 | 9/1957 | Michelson | 33/812 |

FOREIGN PATENT DOCUMENTS

| | | | |
|---|---|---|---|
| 0379779 | 10/1922 | Fed. Rep. of Germany | 33/810 |
| 82270 | 2/1920 | Switzerland | 33/810 |
| 0892229 | 3/1962 | United Kingdom | 33/783 |

Primary Examiner—Thomas B. Will
Attorney, Agent, or Firm—K. Bach

[57] ABSTRACT

A caliper (10) for measuring the thickness of a blade edge composed of: a pair of opposed jaws (11,12) disposed for displacement relative to each other in a first direction, a sliding member (31) mounted to one of the jaws (12) for displacement relative to the one of the jaws (12) in a second direction, the second direction having a component perpendicular to the first direction, the sliding member (31) defining a stop edge between the jaws (11,12), and a guiding member (21) operatively associated with the sliding member (31) for causing the magnitude of the displacement of the sliding member (31) in the second direction to be a fixed proportion of the magnitude of relative displacement of the jaws (11,12) in the first direction.

12 Claims, 3 Drawing Sheets

EDGE THICKNESS CALIPER

BACKGROUND OF THE INVENTION

The present invention relates to calipers which are used to measure the edge thickness of turbine blades.

Turbine blades generally have leading and trailing edges which have a cross section contoured in the shape of a semicircle specified diameter and these edges must be accurately measured to ascertain whether the diameter of each blade edge is within tolerance limits. Because different blade styles have different nominal dimensions and tolerances for the diameters, it is also desirable to have a measuring device which is operable over a range of sizes.

In order to measure the diameter of the blade edge, it is known to employ a pin-type micrometer. However, measurement with a pin-type micrometer is made difficult because no provision is made for locating the correct measurement location on the blade edge. In measuring the diameter of the semicircle at the edge of the blade, the position of measurement should be at a distance of one-half of the semicircle diameter inward from the edge. The blade contour is usually such that the micrometer reading will be incorrect if measurement is made at a position greater or less than one-half of the semicircle diameter inward from the edge.

There has been no accurate or reliable way to locate how far into the blade contour to take the measurement of the diameter. Thus, a method is needed to overcome this source of measurement error.

SUMMARY OF THE INVENTION

It is an object of the present invention to provide a caliper for measuring the edge thickness of a turbine blade which avoids the disadvantages described above.

A more specific object of the invention is to provide a caliper for measuring the edge thickness of a turbine blade at a location inward from the edge by a distance of one-half of the edge diameter.

Another object of the invention is to provide a caliper for measuring edge thickness of a turbine blade which is simple and inexpensive in construction.

The above and other objects are achieved by a caliper for measuring the thickness of a blade edge comprising: a pair of opposed jaws disposed for displacement relative to each other in a first direction, a sliding member mounted to one jaw for displacement relative to the jaws in a second direction, the second direction having a component perpendicular to the first direction, the sliding member defining a stop edge between the jaws, and means for displacing the sliding member so that the stop edge is displaced proportionally to the displacement of the jaws.

DESCRIPTION OF THE PREFERRED EMBODIMENTS

Figure 1:
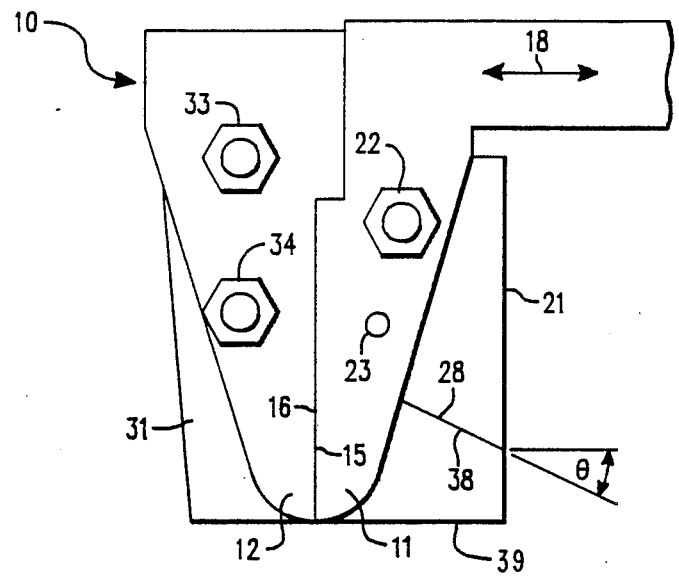
FIG. 1 is a front view of a caliper for measuring edge thickness constructed according to the present invention, showing the caliper in a fully closed position.
Figure 2:
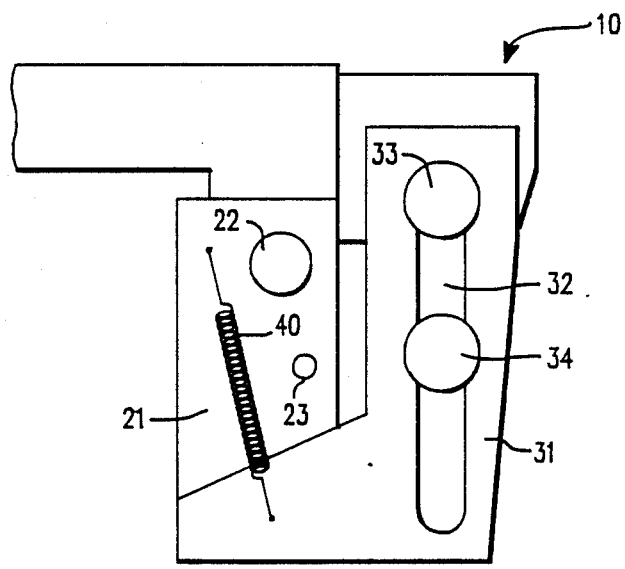
FIG. 2 is a rear view of the caliper of FIG. 1 showing the caliper in a fully closed position.
Figure 3:
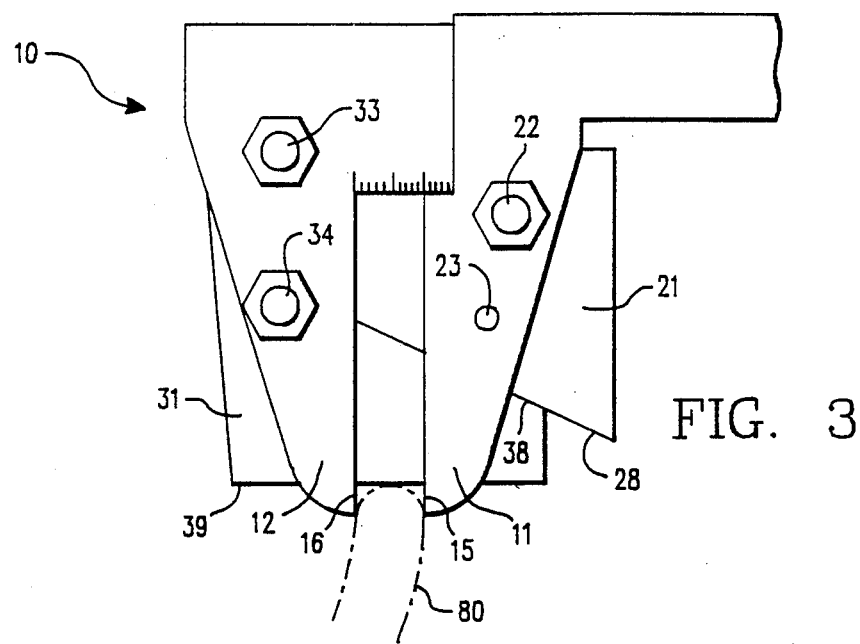
FIG. 3 is a front view of the caliper of FIG. 1 showing the caliper in an open position to measure the edge thickness of a turbine blade.
Figure 4:
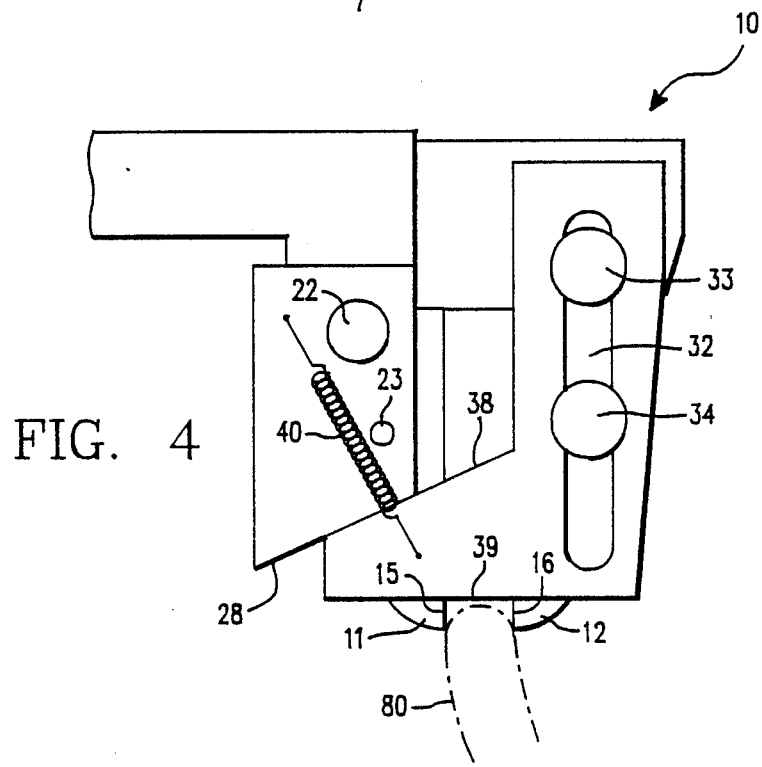
FIG. 4 is a rear view of the caliber of FIG. 3 showing the caliper in an open position to measure the thickness of a turbine blade.

FIGS. 1-4 show a caliper 10 for measuring edge thickness having a pair of opposed jaws 11 and 12 each having a respective inner edge 15 or 16, as shown. The jaws 11 and 12 are slidably attached to one another for movement so that the jaws may be opened horizontally relative to one another in the direction of arrows 18. A suitable guide member may be provided between the jaws to guide the relative movement of the jaws in the horizontal direction. When the jaws are opened, inner edges 15 and 16 are spaced apart along a horizontal direction and remain parallel, as shown in FIGS. 3 and 4. The caliper may also include an indicator such as a dial or linear scale for indicating the distance between the jaws.

The caliper includes a fixed member 21 which is fixedly mounted to jaw 11. The fixed member 21 may be attached to jaw 11 by a threaded fastener 22 and dowel pin 23 as shown, or by any other suitable attachment means. The fixed member 21 includes an edge 28 which is angled at a reference angle $\theta$ from the horizontal direction of movement of the jaws.

The caliper further includes a sliding member 31 which is slidably mounted to jaw 12, so that the sliding member 31 may slide in a vertical direction of movement relative to jaw 12, and perpendicular to the horizontal direction of movement of the jaws 11 and 12. The sliding member 31 may be attached to jaw 12 by a slot 32 disposed vertically along a portion of the sliding member 31, and a pair of threaded fasteners 33 and 34 passing through the slot as shown, or by any other suitable mounting means. The sliding member 31 has an edge 38 which is angled at the reference angle $\theta$ from the horizontal direction of movement of the jaws 11 and 12. Edge 38 is parallel to edge 28 and is disposed so that edges 28 and 38 may slidably contact one another. Sliding member 31 has a stop edge 39 extending along a horizontal line parallel to the direction of movement of the jaws 11 and 12 as shown.

As shown in FIGS. 3 and 4, when the jaws 11 and 12 are spaced apart, the sliding element 31 is displaced vertically. The blade edge 80 may be inserted in the space between edges 15 and 16 of jaws 11 and 12. The depth of insertion is controlled by stop edge 39. An optional biassing element 40 may be provided on the caliper to bias sliding element 31 towards fixed member 21.

Figure 5:
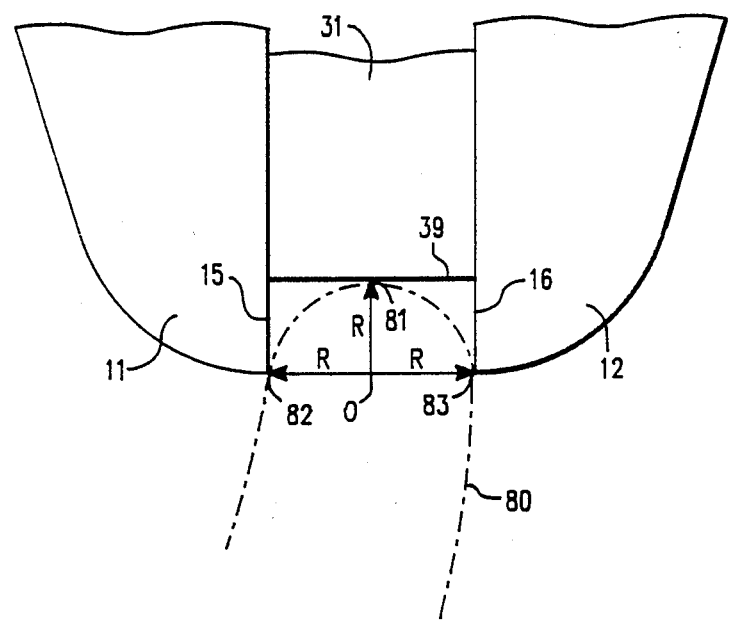
FIG. 5 is a front view of a portion of the caliper of FIG. 1 and a portion of a turbine blade.

The invention will now be further described making reference to its method of operation. FIG. 5 shows an example of a blade edge to be measured. The blade edge may typically be either a leading or a trailing edge of a turbine blade. In order to effect measurement of the blade, the blade is inserted between the inner edges 15 and 16 of jaws 11 and 12. The depth of insertion of the blade is controlled by stop edge 39 as shown.

In this example, the blade 80 to be measured has a chord edge 81 which provides a reference point from which the measurements are taken. The blade surface is defined by a half circle having a center of curvature O and radius R and including points 82 and 83 as well as cord edge 81. It is desired to measure the thickness of the blade 80 between points 82 and 83 such that the distance measured between points 82 and 83 is the diameter of a circle having center O. It can be seen that the diameter D measured is equal to twice the radius R. Thus, measurement points 82 and 83 are located at a vertical distance R inward from the chord edge 81.

When the jaws 11 and 12 are closed so that their inner edges 15 and 16 are in contact with each other, the stop edge 39 is flush with the tips of jaws 11 and 12 as shown in FIGS. 1 and 2. When the jaws are open, sliding member 31 may slide vertically in a direction perpendicular to the horizontal direction of motion of the jaws as shown in FIGS. 3 and 4. Thus, stop edge 39 will be displaced vertically inward from the tips of jaws 11 and 12. The ratio between the displacement of the stop edge 39 relative to the displacement of the jaws 11 and 12 is controlled by the angle $\theta$ at which the sliding face 28 slides along the sliding face 38.

In the example described, it is desired to have the displacement of stop edge 39 be one-half the displacement of jaws 11 and 12. This ratio is achieved by orienting sliding faces 28 and 38 at an angle $\theta = 26°, 33', 54''$. The ratio will be constant throughout the range of movement of jaws 11 and 12 and is given by the equation tangent $\theta = ds/dj$ where dj is the horizontal distance between the jaws and ds is the displacement of the sliding member in the vertical direction. Of course, angle $\theta$ may be constructed to be any of various angles in order to achieve a different measurement ratio, as may be desired to measure an edge having curvature other than a semicircle.

In order to use the invention, the blade edge is positioned between the jaws 11 and 12 until it rests against the stop edge 39. Keeping the stop edge 39 against the blade, the jaws 11 and 12 of the caliper are closed onto the sides of the blade. When edge 39 is in contact with the blade and edges 15 and 16 are both in contact with the blade, the distance between edges 15 and 16 will be equal to diameter D. To assure an accurate reading, caliper 10 may be pivoted slightly about the center of curvature of the blade edge until a minimum reading is obtained with edges 15, 16 and 39 in contact with the blade edge.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A caliper for measuring the thickness of a blade edge comprising:
   a pair of opposed jaws disposed for displacement relative to each other in a first plane, each jaw having a free end,
   a sliding member mounted to one of said jaws for displacement relative to said free ends of said jaws in a second plane, the second plane being substantially perpendicular to the first plane, said sliding member defining a stop edge between said jaws, and
   guiding means operatively associated with said sliding member for causing the magnitude of the displacement of said sliding member in the second plane to be a fixed proportion of the magnitude of relative displacement of said jaws in the first plane and for causing displacement of said sliding member to increase or decrease the distance between said stop edge of said sliding member and said free ends of said jaws as said relative displacement of said jaws increases or decreases the distance between said jaws, respectively,
   wherein the distance between the jaws is used to measure the thickness of the blade edge.

2. A caliper as claimed in claim 1 wherein said sliding member is slidably mounted to said one of said jaws so that the second plane is perpendicular to the first plane.

3. A caliper as claimed in claim 1 wherein said guiding means act to displace said sliding member relative to said one of said jaws in said second plane by a distance of one-half the displacement in the first plane of said jaws.

4. A caliper for measuring the thickness of a blade edge comprising:
   a pair of opposed jaws disposed for displacement relative to each other in a first plane,
   a sliding member mounted to one of said jaws for displacement relative to said one of said jaws in a second plane, the second plane being substantially perpendicular to the first plane, said sliding member defining a stop edge between said jaws, and
   guiding means operatively associated with said sliding member for causing the magnitude of the displacement of said sliding member in the second plane to be a fixed proportion of the magnitude of relative displacement of said jaws in the first plane, said guiding means comprising a fixed member mounted to the other of said jaws and having a first guide edge,
   wherein said sliding member has a second guide edge disposed to slidably contact said first guide edge for controlling the displacement of said sliding member in the second plane during relative displacement of said jaws in the first plane,
   wherein the distance between the jaws is used to measure the thickness of the blade edge.

5. A caliper as claimed in claim 4 wherein each of said guide edges extends at an angle to the first plane.

6. A caliper as claimed in claim 5 wherein the angle is about $26° 33' 54''$.

7. A caliper for measuring the thickness of a blade edge comprising:
   a pair of opposed jaws disposed for displacement relative to each other in a first plane,
   a sliding member mounted to one of said jaws for displacement relative to said one of said jaws in a second plane, the second being substantially perpendicular to the first plane, said sliding member defining a stop edge between said jaws,
   guiding means operatively associated with said sliding member for causing the magnitude of the displacement of said sliding member in the second plane to be a fixed proportion of the magnitude of relative displacement of said jaws in the first plane; and
   indicating means for indicating the relative distance between said jaws;
   wherein the relative distance between said jaws is indicative of the thickness of the blade edge.

8. A caliper as claimed in claim 7 wherein said sliding member is slidably mounted to said one of said jaws so that the second plane is perpendicular to the first plane.

9. A caliper as claimed in claim 7 wherein: said guiding means further comprises a fixed member mounted to the other of said jaw and having a first guide edge; and said sliding ember has a second guide edge disposed to slidably contact said first guide edge for controlling the displacement of said sliding member in the second plane during relative displacement of said jaws in the first plane.

10. A caliper as claimed in claim 9 wherein each of said guide edges extends at an angle to the first plane.

11. A caliper as claimed in claim 10 wherein the angle is about 26° 33′ 54″.

12. A caliper as claimed in claim 7 wherein said guiding means act to displace said sliding member relative to said one of said jaws in said second plane by a distance of one-half the displacement in the first plane of said jaws.

* * * * *